(12) United States Patent
Onno

(10) Patent No.: US 7,382,923 B2
(45) Date of Patent: Jun. 3, 2008

(54) METHOD AND DEVICE FOR PROCESSING AND DECODING A CODED DIGITAL SIGNAL

(75) Inventor: Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 09/981,820

(22) Filed: Oct. 19, 2001

(65) Prior Publication Data

US 2002/0048319 A1    Apr. 25, 2002

(30) Foreign Application Priority Data

Oct. 20, 2000  (FR)  ................................. 00 13475

(51) Int. Cl.
*G06K 9/36*  (2006.01)
(52) U.S. Cl. ................ 382/233; 348/398.1; 348/420.1; 348/421.1; 375/240.11; 382/268
(58) Field of Classification Search ............ 348/398.1, 348/402.1; 358/426.06; 375/240.11, 240.2; 382/233, 232, 276, 235, 250, 253, 246, 268, 382/245, 248, 251, 241, 240
See application file for complete search history.

(56) References Cited

U.S. PATENT DOCUMENTS

| | | | | |
|---|---|---|---|---|
| 5,309,232 A | * | 5/1994 | Hartung et al. | 348/384.1 |
| 5,347,600 A | * | 9/1994 | Barnsley et al. | 382/249 |
| 5,481,553 A | * | 1/1996 | Suzuki et al. | 714/800 |
| 5,710,835 A | | 1/1998 | Bradley | 382/233 |
| RE36,145 E | * | 3/1999 | DeAguiar et al. | 345/538 |
| 6,041,143 A | * | 3/2000 | Chui et al. | 382/232 |
| 6,084,908 A | * | 7/2000 | Chiang et al. | 375/240.03 |
| 6,141,441 A | * | 10/2000 | Cass et al. | 382/166 |
| 6,163,626 A | * | 12/2000 | Andrew | 382/240 |
| 6,249,614 B1 | * | 6/2001 | Kolesnik et al. | 382/251 |
| 6,314,452 B1 | * | 11/2001 | Dekel et al. | 709/203 |
| 6,381,280 B1 | * | 4/2002 | Lynch et al. | 375/240.19 |

(Continued)

FOREIGN PATENT DOCUMENTS

WO    WO 9949412 A1  *  9/1999

OTHER PUBLICATIONS

Silva et al., Variable Block Size Wavelet Video Coding, Oct. 25-28, 1994, Proceedings of the IEEE-SP International Symposium on Time-Frequency and Time-Scale Analysis, 1994., pp. 342-345.*

(Continued)

*Primary Examiner*—Matthew C. Bella
*Assistant Examiner*—Dennis Rosario
(74) *Attorney, Agent, or Firm*—Fitzpatrick, Cella, Harper & Scinto

(57) ABSTRACT

The present invention concerns a method of processing a coded digital signal containing on the one hand a set of samples of different types obtained by coding a set of original samples representing physical quantities and on the other hand a set of information representing original samples and parameters used during the coding, characterized in that it includes the following steps:
  determining the subset of samples corresponding to a part of the coded digital signal using the set of information,
  obtaining the number of samples of at least one predetermined type and which are contained in the given subset of samples,
  deciding with regard to a modification of the determined subset of samples according to the number of samples obtained.

20 Claims, 9 Drawing Sheets

U.S. PATENT DOCUMENTS

Figure 1:
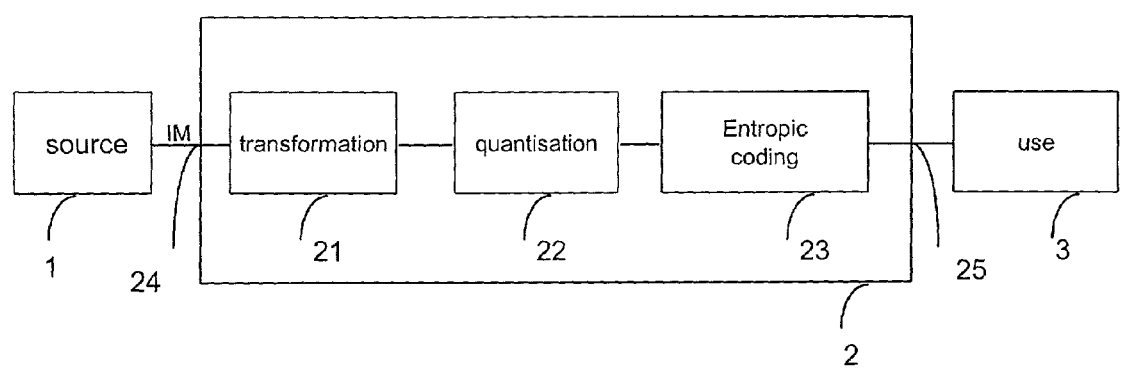

| | | |
|---|---|---|
| 6,501,860 B1 | 12/2002 | Charrier et al. ............. 382/240 |
| 6,658,158 B2 * | 12/2003 | Fukuhara et al. ........... 382/240 |
| 6,678,423 B1 * | 1/2004 | Trenary et al. ............. 382/250 |
| 6,704,440 B1 * | 3/2004 | Kump ........................ 382/132 |
| 6,711,297 B1 * | 3/2004 | Chang et al. ............... 382/240 |
| 6,775,412 B1 * | 8/2004 | Nister et al. ................ 382/243 |
| 2002/0051583 A1 | 5/2002 | Brown et al. .............. 382/299 |

OTHER PUBLICATIONS

E. L. Schwartz, et al., "Optimal Tile Boundary Artifact Removal With Crew", Picture Coding Symposium '99, Proceedings Of Picture Coding Symposium, Portland, Or, USA, Apr. 21-23, 1999, pp. 285-288, XP001001363 1999, Corvallis, Or., USA, Oregon State Univ, USA.

J. X. Wei, et al., "New Method For Reducing Boundary Artifacts In Block-Based Wavelet Image Compression", Visual Communications And Image Processing 2000, Perth, WA, Australia, Jun. 20-23, 2000, vol. 4067, pt. 1-3, pp. 1290-1295, XP001001241, Proceedings Of The SPIE—The International Society for Optical Engineering, 2000, SPIE-Int. Soc. Opt. Eng, USA ISSN: 0277-786x.

I. K. Eom, et al., "A Block Wavelet Transform For Sub-Image Coding/Decoding" Still-Image Compression II, San Jose, CA, USA, Jan. 20-23, 1996, vol. 2669, pp. 169-178, XP001001242, Pr.oceedings Of The SPIE-The International Society For Optical Engineering, 1996, SPIE-Int.. Soc. Opt. Eng, USA, ISSN: 0277-786x.

* cited by examiner

METHOD AND DEVICE FOR PROCESSING AND DECODING A CODED DIGITAL SIGNAL

The present invention concerns a method of processing a coded digital signal including on the one hand a set of samples obtained by coding a set of original samples representing physical quantities and on the other hand a set of information representing the original samples and parameters used during the coding.

The invention applies notably in the field of image processing.

In the context of the standard JPEG2000 currently being drawn up, the structure of the internal data is such that a user can have access to part of a coded image, referred to as a sub-image, without having to decode all the image.

This is advantageous since the user obtains the sub-image which he requires more rapidly than if he had to effect the decoding of the entire image.

A method is known which provides for a prior processing for carrying out the above function. An image format known as "flashpix" is used, which contains a series of images in accordance with the JPEG standard and with a fixed size 64×64. To obtain a part of the image or sub-image in the flashpix format, the method consists of decoding the different small images of size 64×64 in order to obtain the sub-image.

The decoding of a sub-image is made possible because of the structure of the data or samples constituting the coded image and which are organised in blocks, each block constituting a basic unit for the coding of the image.

Because of this, it is possible to access more rapidly the sub-image selected by the user by extracting and decoding only the basic blocks corresponding to this sub-image.

To do this, first of all the sub-image is projected in the different frequency sub-bands which are obtained by decomposing the image into frequency sub-bands according to one or more decomposition levels. Next, in the different sub-bands, the basic blocks in which the sub-image is to be found are identified and are decoded in order to reconstruct the sub-image.

By proceeding thus, the Applicant has found that the sub-image restored by this method has, on its edges, under certain conditions, many defects which considerably degrade the quality of this sub-image.

The Applicant found that this problem could extend to the case of a coded digital signal which is not necessarily a coded image and which contains a set of samples obtained by coding a set of original samples representing physical quantities.

Such a digital signal can for example be a sound signal.

Having regard to the above, the Applicant became interested in a novel method and a novel device for processing a coded digital signal which make it possible to estimate the quality of restoration of part of the signal before decoding it and, possibly, to act on this quality before proceeding with the decoding of this part.

Thus the object of the present invention is a method of processing a coded digital signal containing on the one hand a set of samples of different types obtained by coding a set of original samples representing physical quantities and on the other hand a set of information representing original samples and parameters used during the coding, characterised in that it includes the following steps:

determining the subset of samples corresponding to a part of the coded digital signal using the set of information, obtaining the number of samples of at least one predetermined type and which are contained in the given subset of samples, deciding with regard to a modification of the determined subset of samples according to the number of samples obtained.

Correlatively, the invention relates to a device for processing a coded digital signal containing on the one hand a set of samples of different types obtained by coding a set of original samples representing physical quantities and on the other hand a set of information representing original samples and parameters used during the coding, characterised in that it has:

means of determining the subset of samples corresponding to a part of the coded digital signal using the set of information, means of obtaining the number of samples of at least one predetermined type and which are contained in the given subset of samples, means of deciding with regard to a modification of the determined subset of samples according to the number of samples obtained.

The Applicant completely unexpectedly perceived that the quality with which part of the signal is restored depends on the type of sample present in this signal and the number thereof.

Thus, by determining the number of samples of at least one predetermined type present in this part of the coded signal, it is therefore possible to estimate the quality of restoration of this part of the signal before decoding thereof.

According to this given number of samples which represents the quality of restoration of the part of the signal, it is thus possible to decide or not to modify this part in order to influence its quality of restoration.

Considering that the samples of different types of the coded digital signal are coefficients of frequency sub-bands, firstly which have been obtained by decomposition into frequency sub-bands of the set of original samples and secondly which have been coded, it appears advantageous to be able to select certain particular frequencies of the coded signal.

A particular frequency corresponds to a predetermined type of sample.

In the particular case of the processing of an image, it can thus be advantageous to restore solely the contours of a sub-image.

It should be noted that in practice the determination of the subset of samples corresponding to a part of the coded signal can be achieved firstly by locating the subset of original samples amongst the set of original samples and secondly by projecting this located subset into at least one of the frequency sub-bands obtained during the decomposition into sub-bands of the set of original samples.

More particularly, the object of the present invention is a method of processing a coded digital signal containing on the one hand a set of samples obtained by coding a set of original samples representing physical quantities and on the other hand a set of information concerning the size w, h of the set of original samples and its resolution res, characterised in that it includes the following steps:

locating a subset of original samples of given size zulx, zuly, zh, zw and resolution zres in the set of original samples according to the set of information on size w, h and resolution res of this set, determining, amongst the coefficients of the low-frequency sub-band $LL_0$ of the last decomposition level obtained by decomposition into frequency sub-bands of the set of original samples, the number of coefficients per dimension of the signal which correspond to the located subset, deciding with regard to a modification of the size of this located subset according to the result of the determination step.

Correlatively, the invention relates to a device for processing a coded digital signal including on the one hand a set of samples obtained by coding a set of original samples representing physical quantities and on the other hand a set of information concerning the size w, h of the set of original samples and its resolution res, characterised in that it has:

means of locating a subset of original samples of given size zulx, zuly, zh, zw and resolution zres in the set of original samples according to the set of information of size w, h and resolution res of this set, means of determining, amongst the coefficients of the low-frequency sub-band $LL_0$ of the last decomposition level obtained by decomposition into frequency sub-bands of the set of original samples, the number of coefficients per dimension of the signal which correspond to the located subset, means of deciding with regard to a modification of the size of this located subset according to the result of the determination.

The Applicant completely unexpectedly perceived that this poor quality of the sub-image is related to the lack of coefficients of the low-frequency sub-band of the last decomposition level (coefficients of a predetermined type) in the sub-image projected onto the low-frequency sub-band.

However, by virtue of the information regarding the size and resolution of the set of original samples present in the coded digital signal and the information regarding the size and resolution of the subset of original samples, after decomposition into frequency sub-bands, it is possible to position the coefficients of the low sub-band with respect to the aforementioned subset. This is achieved without needing to know the values of these coefficients and therefore without needing to decode the coded digital signal.

By determining the number of coefficients of the low sub-band corresponding to the sub-set of original samples, the invention makes it possible to estimate, before decoding this subset, the quality with which it will be restored after decoding, to within the decoding errors.

Thus, according to the result of the aforementioned determination, it is possible or not to act on the restoration quality of the subset of original samples before the decoding takes place.

During the decision step, it is possible for example to decide to modify the size zulx, zuly, zh, zw of the subset located in the set of original samples.

In this case, the size of the subset is modified for all the projections of this subset in the different frequency sub-bands considered.

Moreover, it is also possible to decide to modify the size of the subset located solely in the low-frequency sub-band $LL_0$.

According to one characteristic, the decision step takes into account at least one predetermined criterion representing a required level of quality for the restoration of the subset of original samples of the digital signal.

It is thus possible to control the quality of restoration of the subset of original samples.

According to another characteristic, the decision step takes into account at least one predetermined criterion representing a compromise between the required quality level for restoring the subset of original samples and the speed of processing making it possible to restore this subset.

To restore the subset of original samples, it is therefore also possible to take account of the processing capabilities available to the user.

According to one characteristic, the method includes a step of modifying the size of the subset of original samples located.

This step is a consequence of the estimation made of the quality of restoration of the subset of original samples and the fact that this quality was considered insufficient.

More particularly, the modification lies in an increase in the size of the subset of original samples.

Even more particularly, by representing in a space with dimensions corresponding to the dimensions of the digital signal on the one hand the position of the coefficients of the low-frequency sub-band of the last decomposition level and on the other hand the position of the subset of original samples delimited by a boundary, increasing the size of the subset consists of moving its boundary so as to add to this subset at least one coefficient of the low-frequency sub-band per dimension of the digital signal, said at least one added coefficient being situated close to the boundary before the latter is moved.

Thus pertinent samples will be sought beyond the located subset of samples and solely those which are needed.

According to another characteristic, the modification of the size of the located subset of original samples lies in a reduction in the size of this subset.

A reduction is necessary when it is not possible to achieve the required quality of restoration.

More particularly, by representing in a space with dimensions corresponding to the dimensions of the digital signal on the one hand the position of the coefficients of the frequency sub-bands obtained by decomposition of the set of original samples and on the other hand the position of the subset of original samples delimited by a boundary, reducing the size of the subset consists of moving its boundary so as to remove part of this subset and all the frequency sub-band coefficients situated in this part.

Thus only data considered to be superfluous are separated in the located subset.

When the estimation of the quality of restoration of the subset of original samples is satisfactory, the decision step leads to a preservation of the size of this subset.

According to another characteristic, the method also includes a step of increasing the size of the located subset of original samples which does not modify the number of coefficients of the low-frequency sub-band corresponding to said subset.

Thus, by adding to the located subset at least one coefficient of a frequency sub-band other than the low sub-band per dimension of the digital signal, it is possible to improve the quality of restoration of the subset of original samples on the edges thereof.

According to one characteristic, the method of decoding a coded digital signal which has been processed by the method briefly disclosed above, includes the following steps:

extracting the samples from the coded digital signal corresponding to the located subset of original samples whose size has possibly been modified, entropic decoding of these samples, dequantisation of the previously decoded samples, reverse transformation of the decomposition into frequency sub-bands on the previously dequantised samples, restoration of the selected subset of samples.

In this way, solely the samples of the coded signal to which the subset of original samples relates are extracted and, in the particular case where these samples are grouped together in blocks of samples, the corresponding blocks of samples are extracted.

This is advantageous since there is no need to decode all the coded digital signal.

According to another aspect, the invention also relates to:

a means of storing information which can be read by a computer or a microprocessor storing instructions of a computer program making it possible to implement the processing and decoding method according to the invention as briefly disclosed above, and an information storage means which is removable, partially or totally, and which can be read by a computer or microprocessor storing instructions of a computer program making it possible to implement the processing and decoding method according to the invention as briefly disclosed above.

According to yet another aspect, the invention relates to a computer program which can be directly loaded into a programmable device, containing instructions or portions of code for implementing the steps of the processing and decoding method of the invention as briefly disclosed above, when said computer program is executed on a programmable device.

Since the characteristics and advantages relating to the processing device and to the device for decoding a coded digital signal, to the information storage means and to the computer program are the same as those disclosed above concerning the processing method and decoding method according to the invention, they will not be repeated here.

Figure 2:
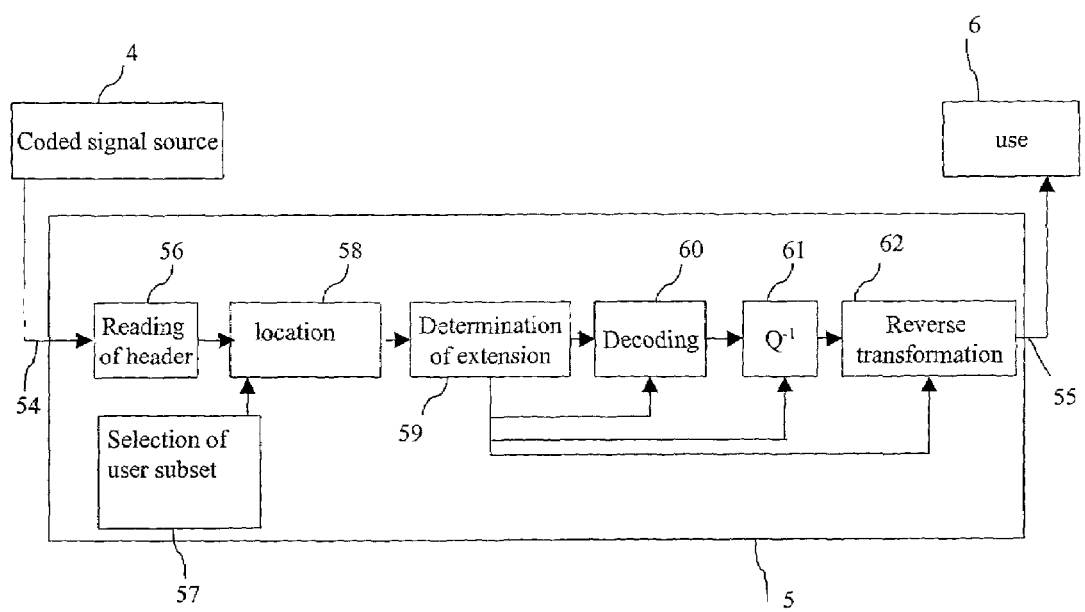
Figure 3:
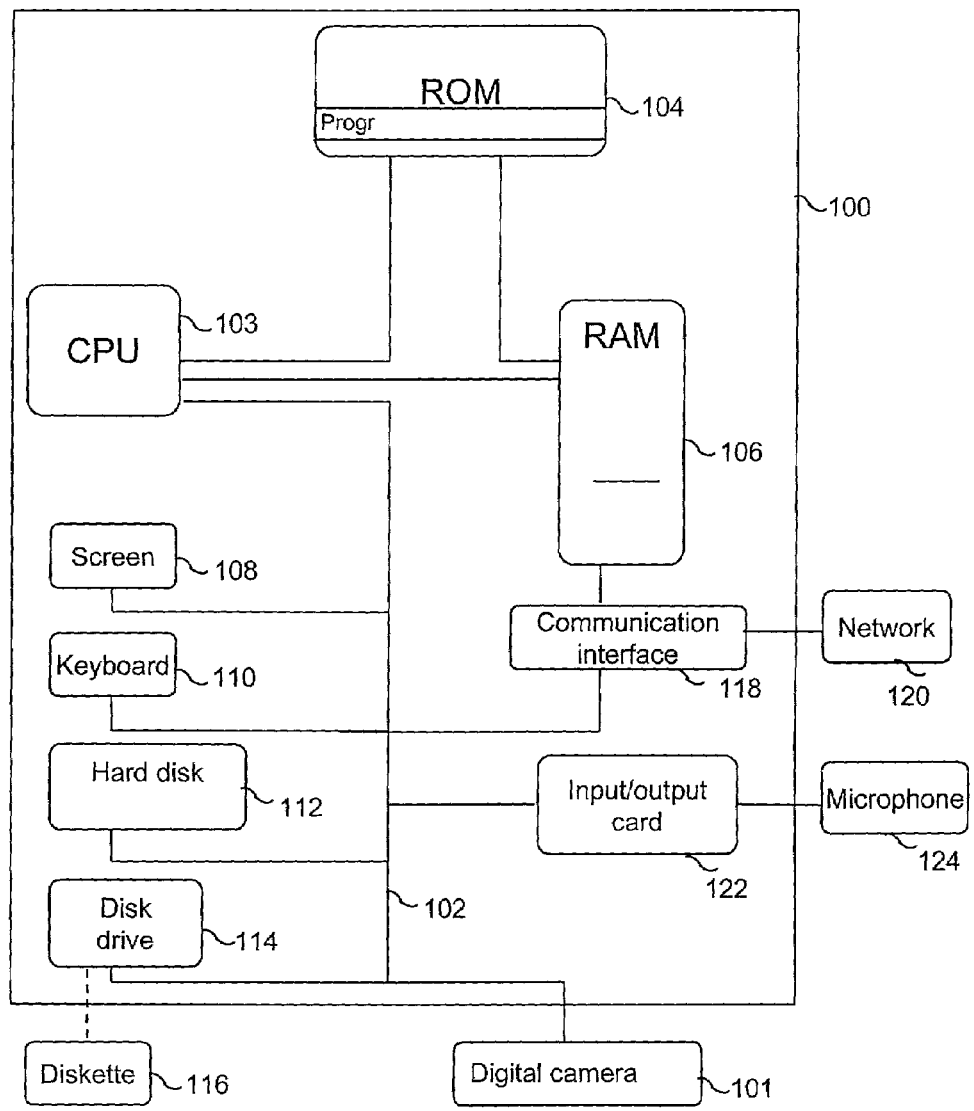
Figure 4A:
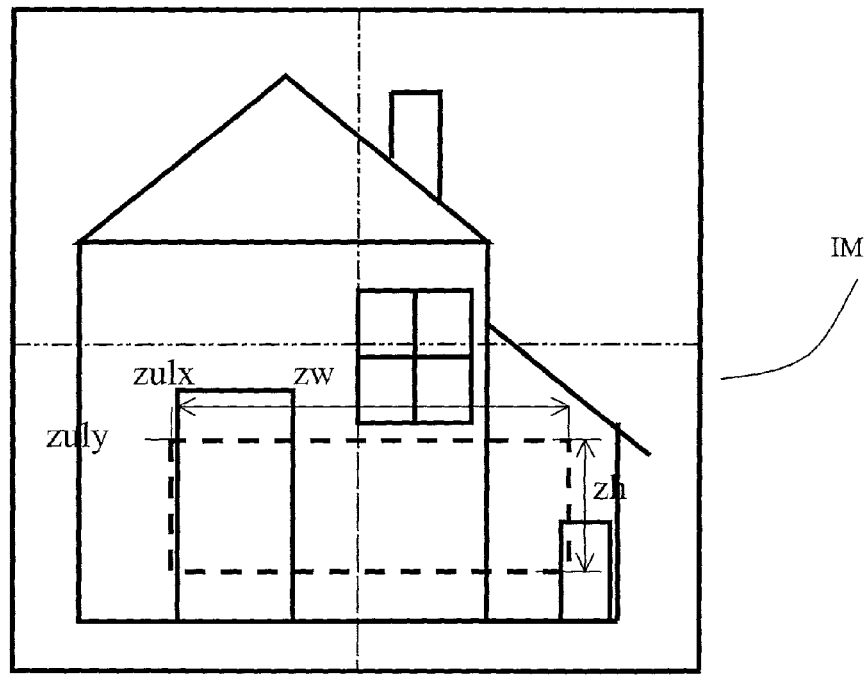
Figure 4B:
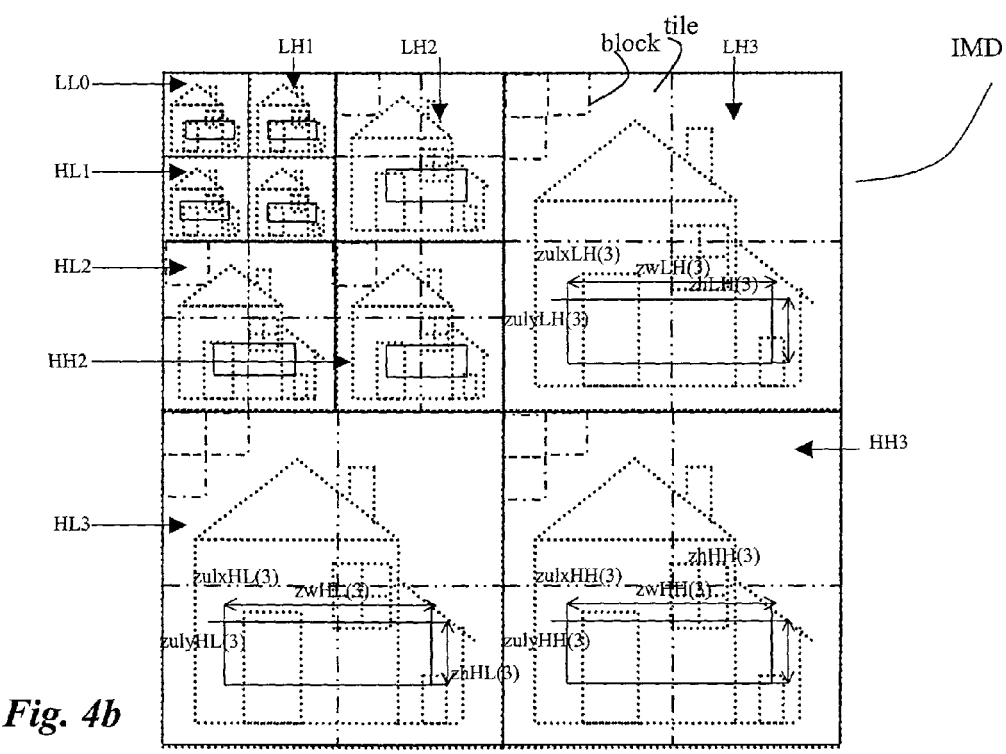
Figure 5:
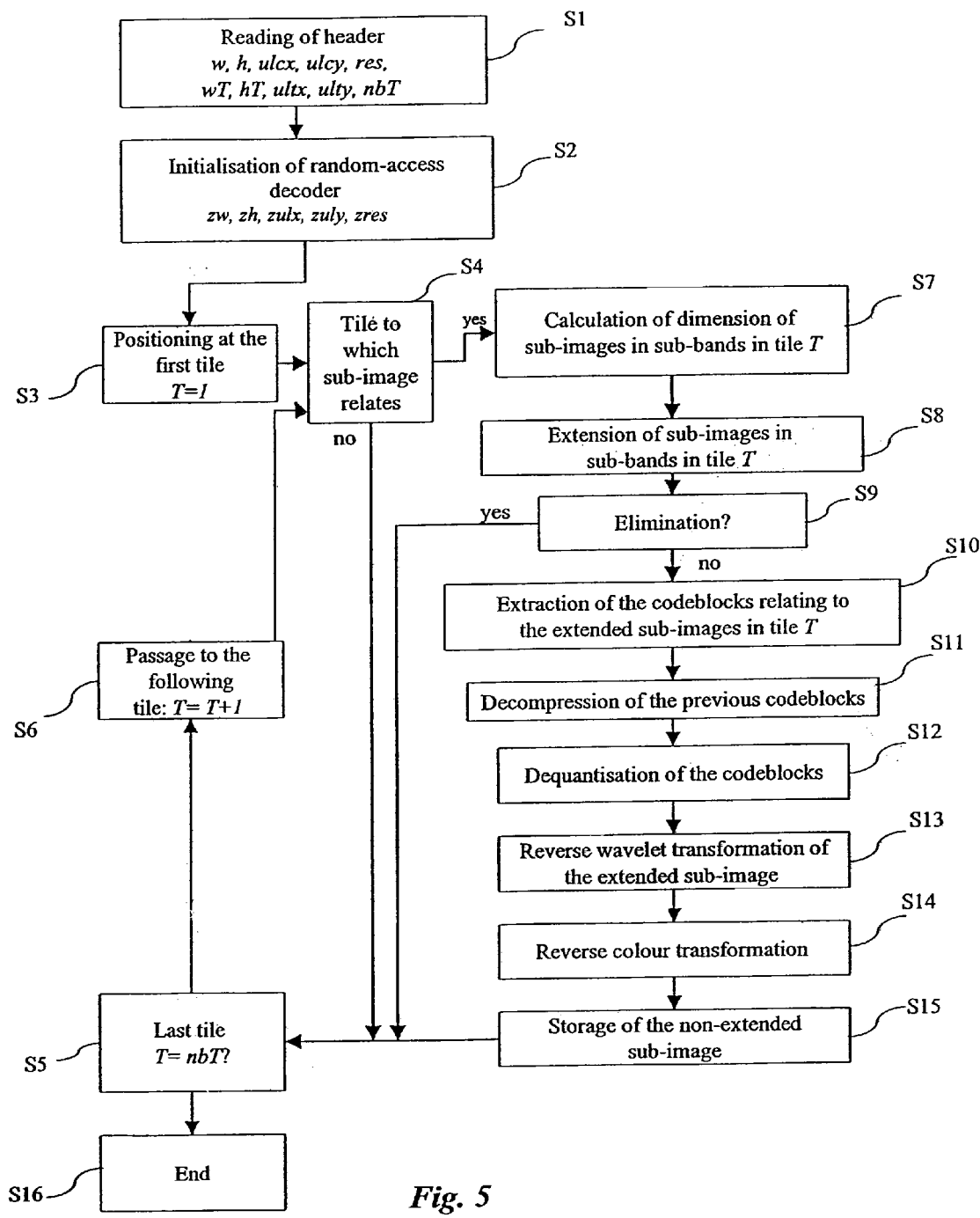
Figure 6:
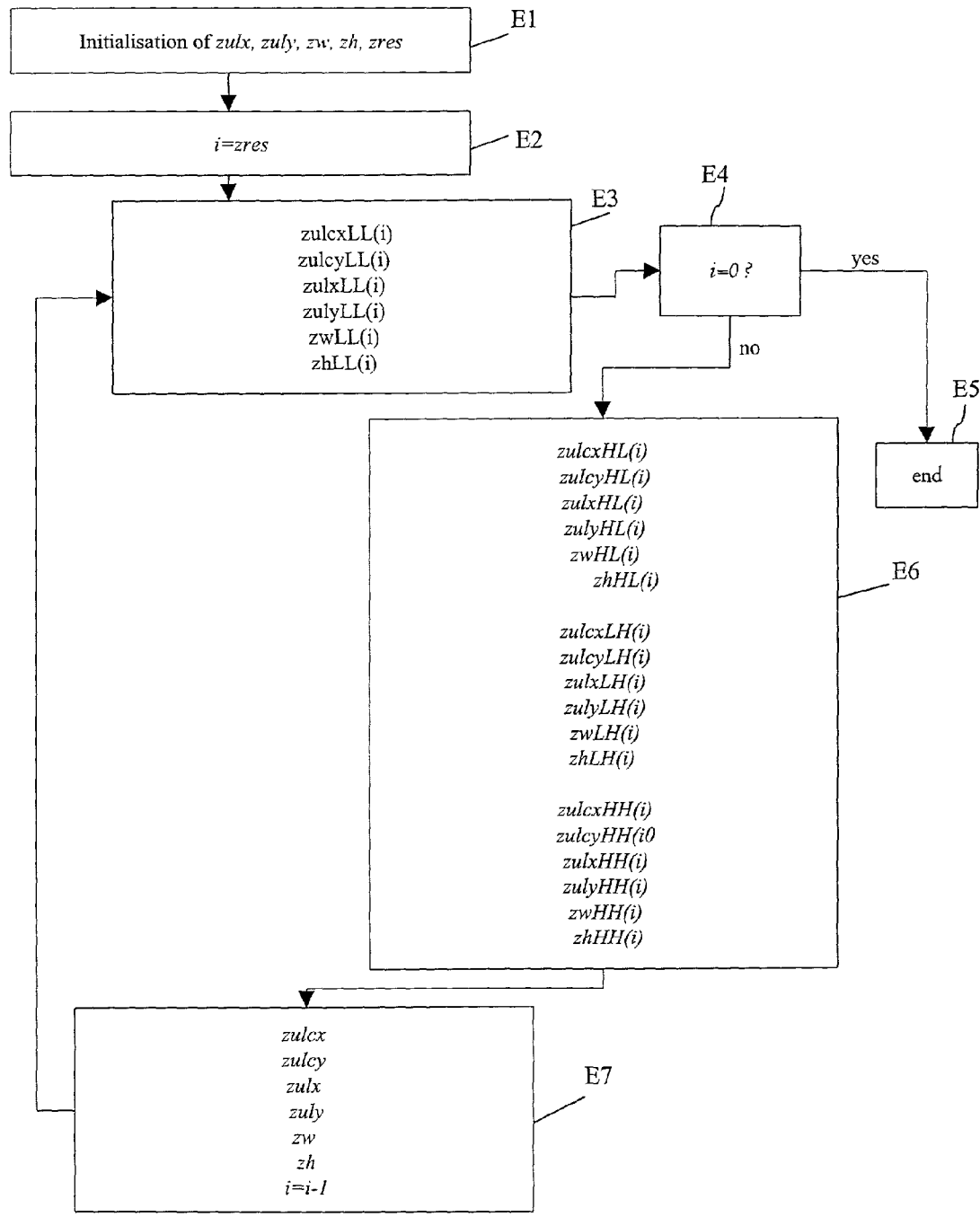
Figure 7:
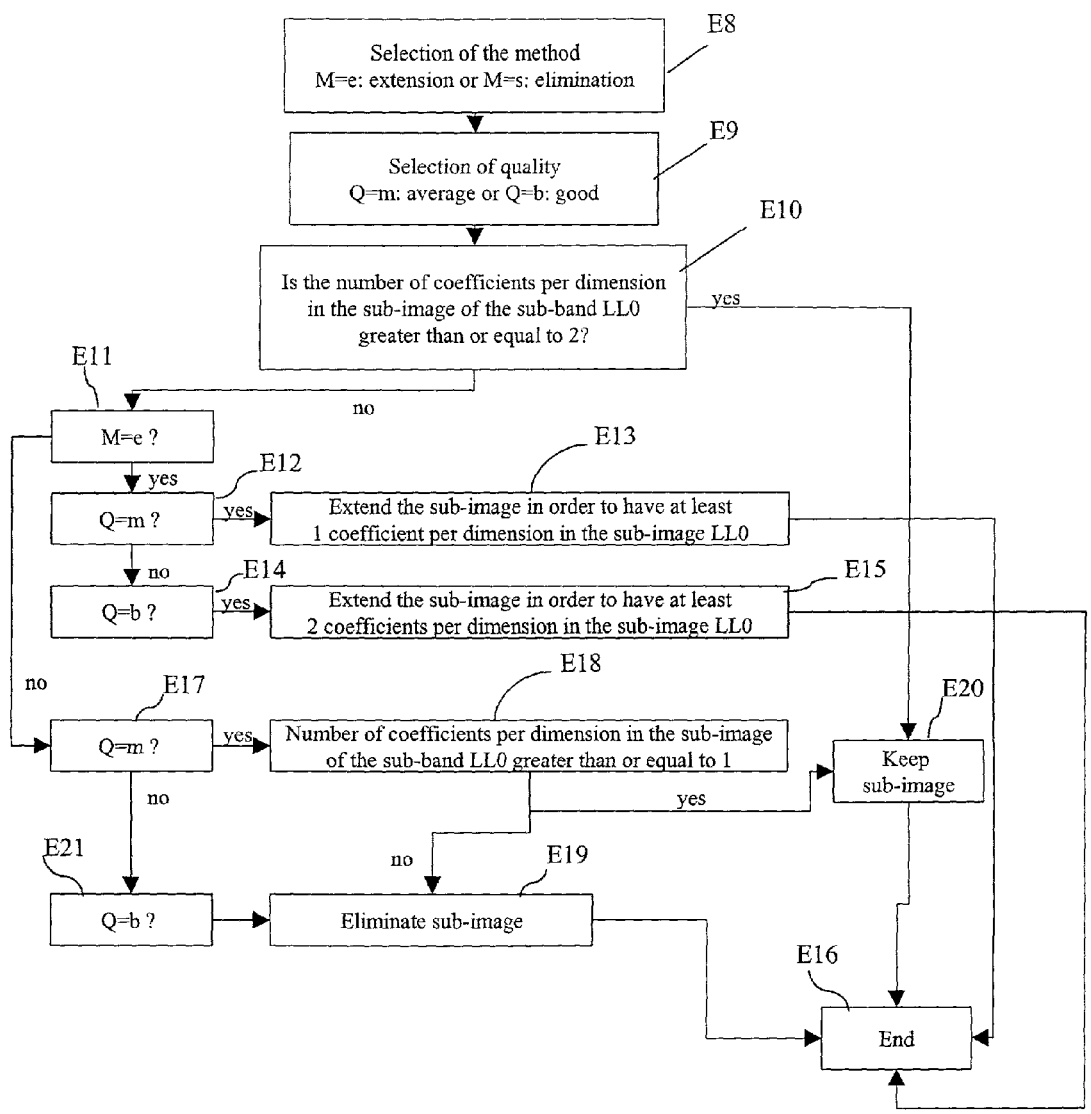
Figure 8:
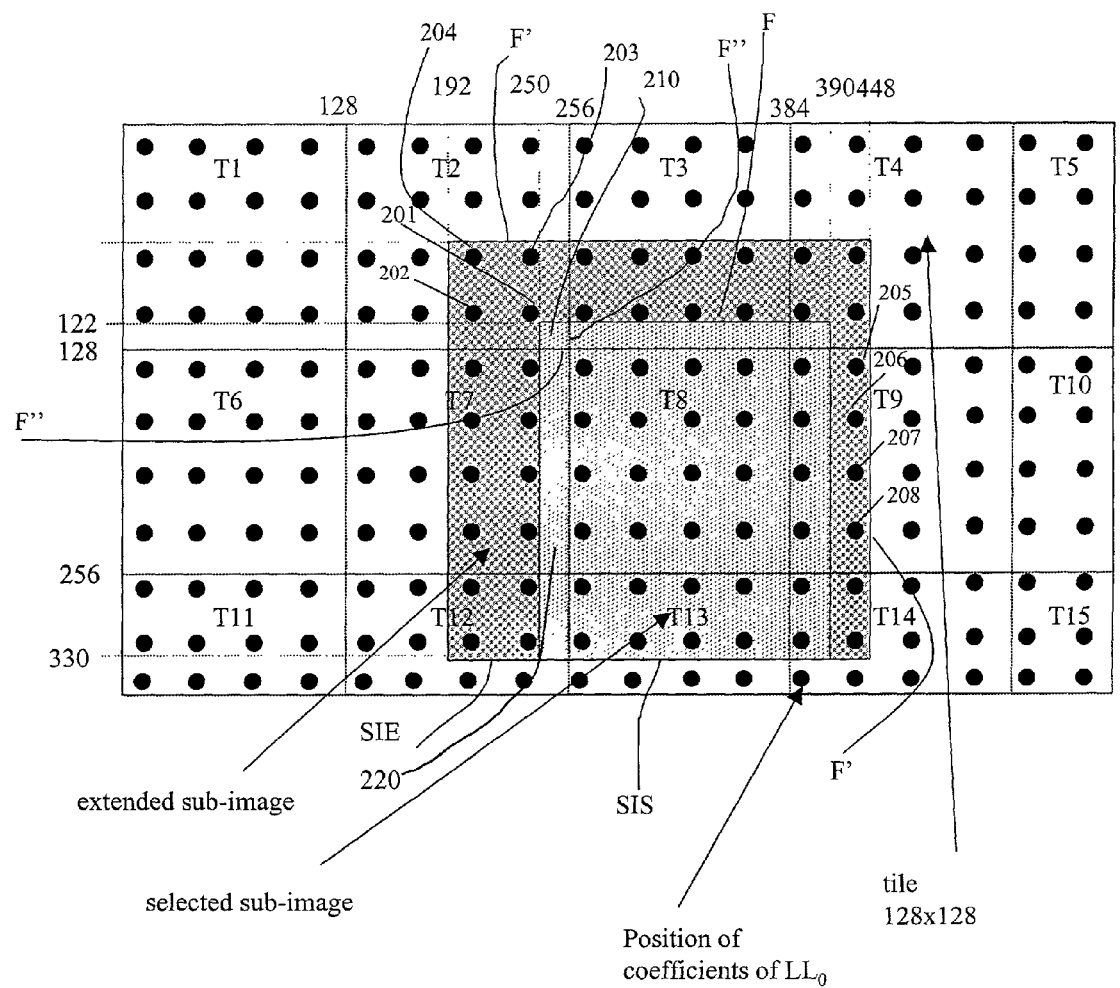
Figure 9:
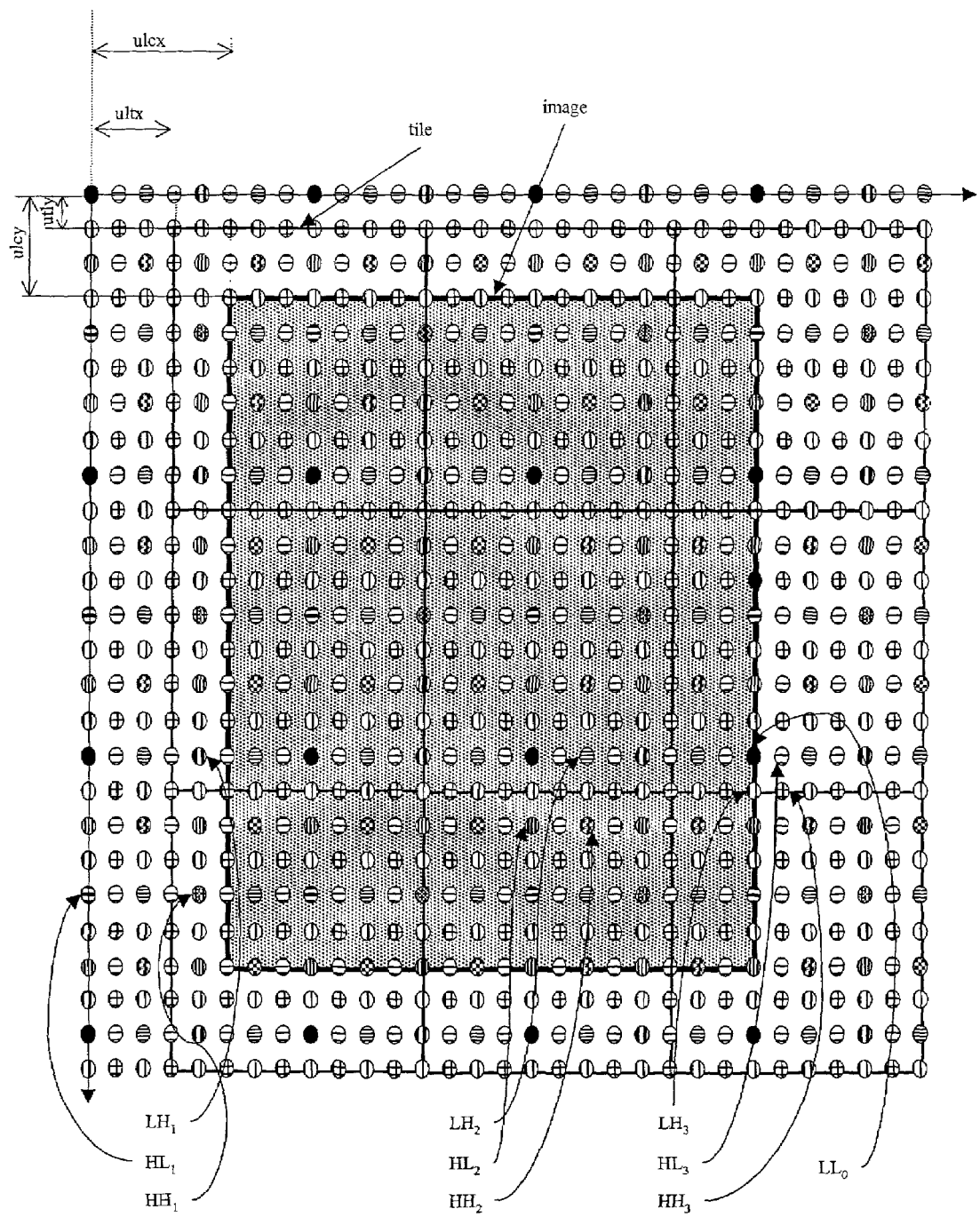

The characteristics and advantages of the present invention will emerge more clearly from a reading of the following description, given solely by way of illustration and made with reference to the accompanying drawings, in which:

FIG. 1 depicts schematically a device for coding a digital signal,

FIG. 2 depicts schematically a device for decoding a coded digital signal according to the invention, FIG. 3 depicts an embodiment of the decoding device of FIG. 2, FIG. 4a depicts an image before coding, FIG. 4b depicts the decomposition into frequency sub-bands of the image of FIG. 4a, FIG. 5 is a decoding algorithm including the processing of an image according to the present invention, FIG. 6 is an algorithm for calculating the dimension of a sub-image which is implemented during the execution of the algorithm of FIG. 5, FIG. 7 is an algorithm for estimating the quality of restoration of a sub-image and for deciding with regard to the modification of the size of this sub-image, FIG. 8 is a spatial representation of an image separated into zones (tiles), of the position of the coefficients of the low sub-band of the last level on this image and of a selected sub-image, FIG. 9 is a spatial representation grid of the different frequency sub-band coefficients.

According to a chosen embodiment depicted in FIG. 1, a data coding device is a device 2 which has an input 24 to which a source 1 of non-coded data is connected.

The source 1 has for example a memory means, such as a random access memory, a hard disk, a diskette or a compact disc, for storing non-coded data, this memory means being associated with a suitable reading means for reading the data therein. A means for recording the data in the memory means can also be provided.

It will be considered more particularly hereinafter that the data to be coded are a series of original digital samples representing physical quantities and representing for example an image IM.

The present invention could be applied to a sound signal in which it is wished to decode an extract of a compressed audio signal. If the original audio signal is encoded according to a principle equivalent to the one used for an image, it would then be necessary to decode a larger time window in order to benefit from the coefficients included in the low sub-band of the last decomposition level. This would be necessary in order to restore this extract without having high sound distortions at the start and end of the extract.

The source 1 supplies a digital image signal IM at the input of the coding circuit 2. The image signal IM is a series of digital words, for example bytes. Each byte value represents a pixel of the image IM, here with 256 levels of grey, or black and white image. The image can be a multispectral image, for example a colour image having components in three frequency bands, of the red-green-blue or luminance and chrominance type. Either the colour image is processed in its entirety, or each component is processed in a similar manner to the monospectral image.

Means 3 using coded data are connected at the output 25 of the coding device 2.

The user means 3 include for example means of storing coded data, and/or means of transmitting coded data.

The coding device 2 includes conventionally, as from the input 24, a transformation circuit 21 which uses decompositions of the data signal into frequency sub-band signals, so as to effect an analysis of the signal.

The transformation circuit 21 is connected to a quantisation circuit 22. The quantisation circuit implements a quantisation which is known per se, for example a scalar quantisation, or a vector quantisation, of the coefficients, or groups of coefficients, of the frequency sub-band signals supplied by the circuit 21.

The circuit 22 is connected to an entropic coding circuit 23, which effects an entropic coding, for example a Huffman coding, or an arithmetic coding of the data quantised by the circuit 22.

FIG. 2 depicts a data decoding device 5 according to the invention, the data having been coded by the device 2.

Means 4 using coded data are connected at the input 54 of the decoding device 5. The means 4 include for example means of storing coded data, and/or means of receiving coded data which are adapted to receive the coded data transmitted by the transmission means 3.

Means 6 using decoded data are connected at the output 55 of the decoding device 5. The user means 6 are for example image display means, or sound reproduction means, according to the nature of the data processed.

The decoding device 5 overall performs operations which are the reverse of those of the coding device 2 except for the first operations.

The device 5 has a circuit 56 for reading all the information representing the original samples and parameters used during coding. This set of information constitutes the header of the coded signal which is applied to the input 54 of said device.

This circuit 56 makes it possible to read the data concerning the size of the set of original samples (image) constituting the image signal and its resolution, that is to say the number of levels of decomposition into frequency sub-bands of this set.

In the case where the image signal is partitioned into zones, also referred to as tiles, this circuit reads the data concerning these tiles, namely their number, width, height and position in the image.

The device 5 also has a circuit 57 for selecting a subset of original samples (sub-image) forming part of the set of original samples constituting the image signal.

The selection of this original sub-image is characterised by data concerning the required size and resolution.

This selection can be made by means of a graphical interface which will also check, when chosen by the user, the validity of the selected sub-image.

This is because the sub-image selected must have a size less than or equal to that of the image in the resolution in question.

The circuits 56 and 57 are connected to a so-called location circuit 58 which thus receives the data concerning the image and the sub-image selected with a view to effecting a calculation of the size of the selected sub-image and its position.

This thus makes it possible to locate the sub-image selected amongst the sub-image.

The decoding device 5 also has a circuit 59 whose function is to estimate the quality of restoration of the selected sub-image and to make a decision with regard to any possible modification of the size of this sub-image in the coded domain.

The functioning of this circuit will be detailed subsequently with reference to FIGS. 5 to 9.

The device 5 also has an entropic decoding circuit 60, which effects an entropic decoding corresponding to the coding of the circuit 23 of FIG. 1. The circuit 60 is connected to a dequantisation circuit 61, corresponding to the quantisation circuit 22. The circuit 61 is connected to a reverse transformation circuit 62, corresponding to the transformation circuit 21. The transformations envisaged here effect a synthesis of the digital signal, from frequency sub-band signals.

It should be noted that the arrows between the blocks represent the data of the coded image which pass between these blocks. The arrows depicted below the blocks for their part represent the related information such as the size of the data to be decoded.

Thus information such as the size and resolution of the data to be decoded are supplied by the circuit 59 to the circuits 60, 61 and 62.

The coding device and/or the decoding device can be integrated into a digital apparatus, such as a computer, printer, facsimile machine, scanner or digital photographic apparatus, for example.

The coding device and the decoding device can be integrated into the same digital apparatus, for example a digital photographic apparatus.

With reference to FIG. 3, there is described an example of a programmable device 100 implementing the invention. This device is adapted to transform a digital signal and to synthesise it.

According to the chosen embodiment depicted in FIG. 3, a device implementing the invention is for example a microcomputer 100 connected to different peripherals, for example a digital camera 101 (or a scanner, or any means of acquiring or storing an image) connected to a graphics card and supplying data to be coded or to be compressed.

The device 100 has a communication bus 102 to which there are connected:

a central unit 103 (microprocessor),
a read only memory 104, containing a program "Progr",
a random access memory 106, containing registers adapted to record variables modified during the execution of the aforementioned program,
a screen 108 for displaying the data to be decoded or serving as an interface with the user, who can parameterise certain decoding modes, using a keyboard 110 or any other means, such as for example a mouse,
a hard disk 112,
a disk drive 114 adapted to receive a diskette 116,
an interface 118 for communicating with a communication network 120 able to transmit digital data to be coded or data coded by the device,
an input/output card 122 connected to a microphone 124 (the data to be processed according to the invention then constitute an audio signal).

The communication bus affords communication between the different elements included in the microcomputer 100 or connected to it. The representation of the bus is not limitative and, notably, the central unit is able to communicate instructions to any component of the microcomputer 100 directly or by means of another component of the microcomputer 100.

The program denoted "Progr" enabling the programmable device to implement the invention can be stored for example in read only memory 104 (referred to as ROM in the drawing) as depicted in FIG. 3. According to a variant, the diskette 116, just like the hard disk 112, can contain coded data as well as the code of the invention which, once read by the device 100, will be stored in the hard disk 112. In a second variant, the program can be received and stored in an identical manner to that described above by means of the communication network 120.

The diskettes can be replaced by any information carrier such as, for example, a CD-ROM or a memory card. In general terms, an information storage means which can be read by a computer or microprocessor, integrated or not into the device, possibly removable, stores a program implementing the processing method according to the invention and, more particularly, the decoding method.

In more general terms, the program can be loaded into one of the storage means of the device 100 before being executed.

The central unit 103 will execute the instructions relating to the implementation of the invention, instructions stored in the read only memory 104 or in the other storage components. On powering up, the processing programs and, more particularly the decoding programs, which are stored in a non-volatile memory, for example the ROM 104, are transferred into the random access memory RAM 106, which will then contain the executable code of the invention, as well as registers for storing the variables necessary for implementing the invention.

FIG. 4a depicts schematically a digital image IM output from the image source 1 in FIG. 1.

This figure is decomposed by the transformation circuit 21 of FIG. 1, which is a dyadic decomposition circuit with three decomposition levels.

The circuit 21 is, in this embodiment, a conventional set of filters, respectively associated with decimators by two, which filter the image signal in two directions, into sub-band signals of high and low spatial frequencies. The relationship between a high-pass filter and a low-pass filter is often determined by the conditions for perfect reconstruction of the signal. It should be noted that the vertical and horizontal decomposition filters are not necessarily identical, although in practice this is generally the case. The circuit 21 includes here three successive analysis units for decomposing the image IM into sub-band signals according to three decomposition levels.

In general terms, the resolution of a signal is the number of samples per unit length used for representing this signal. In the case of an image signal, the resolution of a sub-band signal is related to the number of samples per unit length used for representing this sub-band signal horizontally and vertically. The resolution depends on the number of decompositions made, the decimation factor and the initial image resolution.

The first analysis unit receives the digital image signal SI and, in a known manner, delivers as an output four sub-band signals $LL_3$, $LH_3$, $HL_3$ and $HH_3$ with the highest resolution $RES_3$ in the decomposition.

The sub-band signal $LL_3$ contains the components, or samples, of low frequency, in both directions, of the image signal. The sub-band signal $LH_3$ contains the components of low frequency in a first direction and of high frequency in a second direction, of the image signal. The sub-band signal $HL_3$ contains the components of high frequency in the first direction and the components of low frequency in the second direction. Finally the sub-band signal $HH_3$ contains the components of high frequency in both directions.

Each sub-band signal is a set of real samples (it could also be a question of integers) constructed from the original image, which contains information corresponding to a respectively vertical, horizontal and diagonal orientation of the content of the image, in a given frequency band. Each sub-band signal can be assimilated to an image.

The sub-band signal $LL_3$ is analysed by an analysis unit similar to the previous one in order to supply four sub-band signals $LL_2$, $LH_2$, $HL_2$ and $HH_2$ of resolution level $RES_2$.

Each of the sub-band signals of resolution $RES_2$ also corresponds to an orientation in the image.

The sub-band signal $LL_2$ is analysed by an analysis unit similar to the previous one in order to supply four sub-band signals $LL_0$ (by convention), $LH_1$, $HL_1$ and $HH_1$ of resolution level $RES_1$. It should be noted that the sub-band $LL_0$ forms by itself the resolution $RES_0$.

Each of the sub-band signals of resolution $RES_1$ also corresponds to an orientation in the image.

FIG. 4b depicts the image IMD resulting from the decomposition of the image IM, by the circuit 21, into ten sub-bands and according to four resolution levels: $RES_0$ ($LL_0$), $RES_1$($LL_2$), $RES_2$ ($LL_3$), $RES_3$ (original image). The image IMD contains as much information as the original image IM, but the information is divided in frequency according to three decomposition levels.

Naturally the number of decomposition levels and consequently of sub-bands can be chosen differently, for example 16 sub-bands over six resolution levels, for a bi-dimensional signal such as an image. The number of sub-bands per resolution level can also be different. In addition, the decomposition may not be dyadic. The analysis and synthesis circuits are adapted to the dimension of the signal processed.

In FIG. 4b the samples resulting from the transformation are stored sub-band by sub-band.

It will be noted that the image IM in FIG. 4a is separated into zones, referred to as tiles, only some of which have been depicted in order not to overload the figure. When the image is decomposed by the circuit 21, this image can be decomposed tile by tile.

By collecting together in the same figure the different images resulting from the tile by tile decomposition of the image IM, the result is the image IMD of FIG. 4b, on which the tiles appear.

In addition, each tile of the image IMD is partitioned into blocks, some of which are depicted in FIG. 4b.

The circuits 22 and 23 of FIG. 1 apply independently to each block of each tile in question. The image signal coded by the circuit 2 thus conveys blocks of samples obtained by the original coding of the samples and which constitute the bitstream.

These blocks of samples are known in English terminology as "codeblocks" and take the position indicated in FIG. 4b.

The coded image signal also has a header as indicated above with reference to FIG. 2.

This header includes notably the information concerning the size of the image, namely its width w and its height h, its position in a reference frame represented by the coordinates ulcx (the X-axis) and ulcy (the Y-axis), as well as the number of resolutions res.

Moreover, as the coded image includes tiles, the header also contains information containing these tiles, namely their number nbT, their width wT, their height hT and their position represented by the coordinates ultx and ulty.

The information appearing in the header of the coded signal will make it possible, as soon as the latter is received and read, to have information on the coding of the signal.

FIG. 5 is an algorithm containing different instructions or portions of code corresponding to steps of the method of processing the coded digital image signal according to the invention.

More particularly, this algorithm constitutes an algorithm for decoding the coded signal according to the invention.

The computer program denoted "Progr", which is based on this algorithm, is stored in the read only memory 104 of FIG. 3, on initialisation of the system, and is transferred into the random access memory 106. It is then executed by the central unit 103, which thus makes it possible to implement the method according to the invention in the device of FIG. 3.

As depicted in FIG. 5, a first step of the algorithm, denoted S1, consists of reading the aforementioned data represented by the following notations: w, h, ulcx, ulcy, res, wT, hT, ultx, ulty and nbT.

These data are stored in registers of the random access memory 106 in FIG. 3.

During the following step S2, the user selects a sub-image from the image IM in question depicted in FIG. 4a.

To do this, the user specifies the size of this sub-image represented by the notations zw (width of the sub-image) and zh (height of the sub-image), as well as the coordinates zulx (the position on the X-axis of the top corner of the sub-image) and zuly (the position on the Y-axis of the top left-hand corner of this sub-image) making it possible to locate this sub-image in the image IM in question (FIG. 4a).

The user also specifies the resolution, denoted zres, of the chosen sub-image.

The user can, for example, request a sub-image with a resolution less than that of the image in question.

Thus, for example, only the sub-bands $LL_0$, $LH_1$, $HL_1$, $HH_1$, $LL_2$, $LH_2$, $HL_2$ and $HH_2$ may be concerned.

As mentioned above, this step can be performed by means of a graphical interface (FIG. 2).

The data zw, zh, zulx, zuly and zres are also stored in registers of the random access memory 106 of FIG. 3.

This selection step is followed by a step S3, during which a position is taken on the first tile $T_1$ of the image in question.

Step S3 leads to step S4, during which a test is carried out in order to know whether the selected sub-image relates to the tile.

During the description of FIG. 5 and seq, reference will also be made to FIG. 8, which depicts the spatial position of the different coefficients of the low-frequency sub-band of the last resolution, denoted $LL_0$.

The space considered in FIG. 8 is a space with dimensions corresponding to the dimensions of the digital image signal, namely a space of dimension 2.

In this space, the arrangement of the different tiles denoted T1 to T15 and constituting the image has also been depicted.

Each black dot represents a coefficient of the low sub-band $LL_0$.

The different figures shown on the X-axis and Y-axis indicate the coordinates of the tiles in question as well as the coordinates of the different particular regions considered in this representation.

Thus a first region corresponding to the selected located sub-image, which is indicated by the reference denoted SIS, has been depicted.

This region is delimited from the remainder of the image by a line representing a boundary denoted F.

This representation is particularly advantageous since, as will be seen subsequently, it makes it possible to estimate the quality of restoration of the selected sub-image quickly and in a graphic manner and to proceed rapidly with a decision with regard to any modification of the size of this sub-image according to the aforementioned quality estimation.

It would also be equivalent to the representation of FIG. 8 to project the selected located sub-image SIS into the low sub-band of the last level $LL_0$ (FIG. 4b) and to determine in this sub-image the number of coefficients of this low sub-band in this FIG. 4b.

In the case of the tile T1, the selected sub-image SIS is not concerned and step S4 is followed by a step S5 during which another test is carried out in order to determine whether it is a case of the last tile in the image.

In our case, step S5 is followed by a step S6 during which the tile counter is incremented and the concern is now with the tile T2.

The test carried out at step S4 this time leads to step S7.

During step S7, the size or dimension of the sub-image projected into the different frequency sub-bands is calculated for the tile in question.

Although FIG. 4b depicts the projection of the selected sub-image in the different sub-bands obtained by the decomposition of the image rather than of the tile in question, the principle remains applicable if a tile is considered to be an image portion.

This step S7 is decomposed according to the different steps of the algorithm depicted in FIG. 6. This algorithm includes a step E1 of initialising the values of the parameters zulx, zuly, zw, zh and zres corresponding to the selected sub-image.

In addition, it should be noted that it is also possible to add the coordinates zulcx (X-axis) and zulcy (Y-axis) corresponding to the coordinates of the image with respect to an original reference frame, where these coordinates are not merged with the origin of the reference frame.

For reasons of simplification, the case will be adopted where the coordinates zulcx and zulcy are merged with the origin of the reference frame.

Step E1 is followed by a step E2, during which a parameter i is fixed as being equal to the resolution zres required by the user for the selected sub-image.

In the case concerned here, i is equal to 3.

Step E2 is followed by a step E3, during which, during the first iteration, the size of the sub-image in the sub-band LL(3) is calculated.

During this step, zulcxLL(3), zulxLL(3), zulcyLL(3), zulyLL(3), zwLL(3) and zhLL(3) are thus calculated in the following manner:

– $zulcxLL(3)=zulcx$ and $zulcyLL(3)=zulcy$ (this calculation is simplified given that the terms zulcx and zulcy are equal to zero)

– $zulxLL(3)=E((zulx+1)/2)$

– $zulyLL(3)=E((zuly+1)/2)$

– $zwLL(3)=E((zulx+zw+1)/2)-zulxLL(3)$, where $E(a)$ designates the mathematical function integer part of a – $zhLL(3)=E((zuly+zh+1)/2)-zulyLL(3)$.

The calculations made during this step are only intermediate calculations whose results are stored in registers in the memory 106.

During the following step denoted E4, a test is carried out on the parameter i in order to determine whether it is equal to zero.

In the affirmative, step E4 is followed by a step E5 ending the algorithm.

In the negative, step E4 is followed by a step E6, during which a calculation is made of the size of the selected sub-image in the different frequency sub-bands $HL_3$, $LH_3$ and $HH_3$, taking i=3 in the following formulae:

$zulxHL(i)=E(zulx/2)$ $zulyHL(i)=zulyLL(i)$ $zulcxHL(i)=zulcx+zwLL(i)$ $zulcyHL(i)=zulcy$ $zwHL(i)=E((zulx+zw)/2)-zulxHL(i)$ $zhHL(i)=zhLL(i)$ $zulxLH(i)=zulxLL(i)$ $zulyLH(i)=E(zuly/2)$ $zulcxLH(i)=zulcx$ $zulcyLH(i)=zulcy+zhLL(i)$ $zwLH(i)=zwLL(i)$ $zhLH(i)=E((zuly+zh)/2)-zulyLH(i)$ $zulxHH(i)=zulxHL(i)$ $zulyHH(i)=zulyLH(i)$ $zulcxHH(i)=zulcxHL(i)$ $zulcyHH(i)=zulcyLH(i)$ $zwHH(i)=zwHL(i)$ $zhHH(i)=zhLH(i).$ Thus $zulcxHL(3)$, $zulxHL(3)$, $zulcyHL(3)$, $zulyHL(3)$, $zwHL(3)$ and $zhHL(3)$ are calculated, and then $zulcxLH(3)$, $zulxLH(3)$, $zulcyLH(3)$, $zulyLH(3)$, $zwLH(3)$ and $zhLH(3)$.

Next, the size of the sub-image in the sub-band $HH_3$ is calculated, which supplies the elements $zulcxHH(3)$, $zulxHH(3)$, $zulcyHH(3)$, $zulyHH(3)$, $zwHH(3)$ and $zhHH(3)$.

The different elements which have just been calculated during step E6 are transferred to the corresponding sub-bands $HL_3$, $LH_3$ and $HH_3$. These elements are also stored in registers in the random access memory 106 in FIG. 3.

The following step E7 consists of updating the different elements calculated for the low sub-band $LL_3$ with a view to its new decomposition.

The updating is effected by means of the following equalities:

$zulx=zulxLL(i)$ $zuly=zulyLL(i)$ $zulcx=zulcxLL(i)$ $zulcy=zulcyLL(i)$ $zw=zwLL(i)$ $zh=zhLL(i).$ At the end of this step the parameter i is then decremented to the value 2.

At the following cycle, step E3 leads to the calculation of the size of the sub-image projected in the sub-band $LL_2$ and, during step E6, to the calculation of this same sub-image projected in the sub-bands $HL_2$, $LH_2$, $HH_2$.

These calculations are made using the formulae presented above during the calculation of the size of the sub-image in the sub-band signals $LL_3$, $LH_3$, $LH_3$ and $HH_3$.

In a similar manner, step E7 makes it possible to update the coefficients obtained during the previous calculations of the size of the sub-image projected in the sub-band signals $LL_2$, $HL_2$, $LH_2$ and $HH_2$.

The results of this step are stored in registers of the memory 106.

The parameter i is next decremented to the value 1 and step E3 once again executed makes it possible to calculate the size of the sub-image projected in the sub-band $LL_1$. During step E6, a calculation is made of the size of this same sub-image projected in the sub-bands $HL_1$, $LH_1$, $HH_1$ using the same formulae as before.

The calculations of step E6 lead by themselves to the location of the selected sub-image in the different frequency sub-band signals of the last resolution level, namely $HL_1$, $LH_1$ and $HH_1$.

The step E7 of updating the coefficients and decrementing i to 0 is followed by step E3, which makes it possible to calculate the size of the sub-image projected in the low sub-band of the last resolution level $LL_0$.

The result issuing from this step makes it possible to locate the sub-image selected in the low sub-band $LL_0$ of the image in question by marking its position in the latter (FIG. 4b).

Step E3 is then followed by step E4 and step E5 ending the algorithm.

It should be noted that the above calculations have just been made for a projection of the sub-image in the tile T2 of the image in question. The calculation principle remains the same when the image is not divided into tiles since then the image can be considered to be a single tile (FIG. 4b).

The processing according to the invention carried out during steps S7, E1 to E7 on the header of the coded image signal continues with step S8 in FIG. 5.

During step S8 on the one hand an estimation of the quality with which the tile T2 of the selected sub-image can be restored is carried out, to within the decoding errors, and on the other hand a possible intervention on this restoration quality is proceeded with before the decoding of this sub-image.

This step S8 is decomposed according to the different steps of the algorithm in FIG. 7, which form part of the algorithm of FIG. 5, just like steps E1 to E7 of the algorithm in FIG. 6.

During the execution of the algorithm depicted in FIG. 7, either the size of the selected located sub-image is increased, or its size is reduced, or the size of this sub-image is preserved according to the results of a search step carried out at step E10 and the taking into account of criteria selected during step E9.

The algorithm of FIG. 7 begins with a step E8, during which the mode chosen for acting on the quality of the sub-image is selected, namely extension mode (increase in size) or elimination mode (reduction in size).

The choice of this mode can be made by taking account of the calculation time available to the user and/or the processing capacity available.

For example, for tile T2, the user will choose the extension mode if he has sufficient processing capacity.

The following step E9 makes it possible to set up a predetermined criterion representing a required level of quality for restoring the sub-image.

For example, two quality levels are adopted, an average level denoted m and a good level, representing a good quality and which is denoted b.

It should be noted that more than two levels can be taken into consideration such as, for example, a low quality, an acceptable quality and finally a quality corresponding to that of the image which is entirely decoded.

However, in this example there will merely be the aforementioned two quality levels and, for example, for tile T2 a good quality b will be selected.

By implementing steps E8 and E9 a predetermined criterion representing a compromise between the required quality and the calculation time or speed of processing of the data is in some way taken into account.

It should be noted that this way of proceeding is not obligatory.

This is because the user can, on the contrary, place emphasis on the quality criterion independently of the calculation time and therefore of the data processing speed.

During the following step denoted E10, first of all a determination is carried out, which can be done with the help of the representation in FIG. 8, of the number of coefficients of the low sub-band of the last level $LL_0$ per dimension of the image and which correspond to the selected located sub-image SIS.

To do this, on a practical level, the number of coefficients of the low sub-band within the region delimited by the boundary F is sought.

A test is next carried out, which consists of determining whether the number of coefficients identified is greater than or equal to 2.

In the case concerned here, given that the image is considered tile by tile, when the number of coefficients of the tile T2 corresponding to the sub-image SIS is determined, it is seen that there are none.

Step E10 is then followed by a step E11, during which a test is carried out in order to determine the chosen mode for the processing of the signal, namely extension or elimination.

In the case concerned here, the chosen mode is extension and step E11 is followed by a step E12, during which a test is carried out in order to determine whether the selected quality corresponds to the average quality (Q=m).

In the affirmative, step E12 is followed by a step E13, during which it is decided to extend the selected and located sub-image SIS of FIG. 8 in order to have at least one coefficient of the low sub-band $LL_0$, per dimension, in the part of the sub-image which overlaps with the tile T2.

However, in the case concerned here, the quality chosen is quality b and the test carried out at step E12 therefore leads to step E14, during which a test is carried out in order to determine whether the chosen quality is the quality b.

Next the following step E15 is passed to.

Having regard to the result of the determination of coefficients carried out at step E10, of the extension mode chosen at step E9, it is decided, during step E15, to increase the size of the sub-image in order to add to it at least two coefficients of the low sub-band $LL_0$ per dimension, in the part of the sub-image which overlaps with tile T2.

Thus two coefficients are added in the horizontal direction and in the vertical direction in tile T2, which amounts to moving the boundary F delimiting the sub-image SIS as indicated in FIG. 8.

The coefficients which have been added are indicated by the references 201, 202, 203 and 204 in this figure.

According to the invention, it is thus proposed to choose, in an appropriate manner, supplementary coefficients of the low sub-band of the last level to be added to the sub-image in order to improve the quality of restoration of the latter.

These coefficients to be added are located on each side of the sub-image projected in the low sub-band.

This is because, in the aforementioned example, since the part of the selected and located sub-image SIS which overlaps with tile T2 contains no coefficient of the low sub-band $LL_0$, the restoration of this part of the sub-image would have resulted in poor quality.

As soon as the decision to modify the size of the sub-image has been taken and the modification has taken place, step E15 is followed by a step E16 ending the algorithm of FIG. 7.

Returning to FIG. 5, step S8 is followed by a step S9 during which a test is carried out in order to determine whether an elimination has been effected.

In the case concerned here, step S9 leads to a step S10 during which an extraction of the samples is carried out and, more particularly, of the blocks of samples of the coded digital image signal which correspond to the extension of the sub-image SIS in the tile T2 in question.

Step S10 is then followed by a step S11 during which an entropic decoding or decompression of the blocks previously extracted is carried out and then, during a step S12, a dequantisation of these decoded blocks.

The following step S13 applies to these blocks thus dequantised a transformation which is the reverse of the decomposition into frequency sub-bands carried out on coding.

It should be noted, for example, that it is a case here of a reverse wavelet transformation.

At the end of step S13, an extended part of the sub-image of the coded image is thus restored and, during step S14, a reverse colour transformation can possibly be set up on the restored image part if the colour image has, during its coding, undergone a colour transformation.

This step is followed by a storage step S15 which consists simply of extracting, from the extended part of the sub-image which overlaps on FIG. 8 with the tile T2, the non-extended part of this sub-image which was requested by the user.

This part requested by the user will thus be able to benefit from increased quality because of the extension carried out as indicated above.

It should be noted that steps S10 to S15 are each known per se to the man skilled in the art. It should be noted that operations S13, S14 and S15 could be combined in a single step.

It will be noted from a reading of FIG. 8 that the same procedure is followed for tiles T3, T4, T7 and T12.

The processing of tiles T9 and T14 according to the invention will now be dealt with.

Step S8 and more particularly the algorithm of FIG. 7 is started from directly in order to consider the processing of tile T9 or T14.

Extension mode is for example still chosen during step E8 and, during step E9, quality b is selected.

The search step carried out at step E10 reveals the presence of a coefficient of the low sub-band $LL_0$ per dimension in the part of the selected and located sub-band SIS which overlaps with tile T9.

Because of this, the result of the test is negative and steps E11, E12 and E13 are executed.

During this last step, because of the extension mode chosen and the good quality criterion selected, an increase in the size of the part in question of the sub-image is proceeded with by adding one coefficient per horizontal dimension and four coefficients per vertical dimension in order to cover the entire tile T9.

These coefficients were, before movement of the boundary F, in the immediate vicinity thereof and are now within the boundary F'.

The added coefficients are indicated by the references 205, 206, 207 and 208.

In an identical fashion to what was described above concerning the processing of tile T2, steps S10 to S15 of the algorithm of FIG. 5 are applied to tile T9 or Tl4.

A description will now be given of the processing of tile T8 or T13 according to the algorithm of FIG. 7.

By choosing an extension mode and good quality respectively during the execution of steps E8 and E9, step E10 is led to, during which the search for coefficients reveals more than two coefficients per dimension, for example, for tile T8.

In this case, step E10 is followed by a step E20 during which it is decided to keep the size of this sub-image, having regard to the required quality and the result obtained at step E10.

Step E20 is next followed by step E16 ending the execution of the algorithm of FIG. 7.

According to another hypothetical case with respect to the representation in FIG. 8, the processing of tile T2 will now be dealt with in order to illustrate the elimination mode.

During the running of the algorithm in FIG. 7, this time the elimination mode is chosen in order to reduce the calculation time and therefore the speed of processing of the data according to the invention.

During step E9 a good quality (Q=b) is selected.

In the case of tile T2, step E10 does not make it possible to identify low sub-band coefficients in the part of the image which overlaps with tile T2, and therefore step E10 is followed by a step E11.

Having regard to the chosen mode (elimination), step E11 is followed by a step E17 during which a test is carried out in order to determine whether the chosen quality was the average quality (Q=m).

In our case, step E17 is followed by a step E21, during which another test is carried out in order to know whether the chosen quality is the good quality (Q=b).

Step E21 is therefore followed by step E19, during which it will be decided to reduce the size of the part of the sub-image which overlaps with tile T2.

This reduction in size will consist of moving the boundary F depicted in FIG. 8 in order to adopt a new position represented by the boundary F", so as to withdraw from this sub-image all the coefficients of the different frequency sub-bands contained in the part of the sub-image identified by the reference 210.

It should be noted that, if an average quality had been chosen for this tile, step E17 would have led to steps E18 and E19.

On the other hand, where the elimination mode has been chosen and the concern is with the processing of the tile T9, with a selection of average quality, steps E8, E9, E10, E11, E17 and E18 are executed.

Given that the number of coefficients is greater than or equal to 1, step E18 is then followed by step E20, during which it is decided to keep the size of this part of the sub-image.

When the sub-image selected by the user and located in the image has been extended according to the invention in order to restore a good quality, then the extended sub-image SIE, which is depicted in FIG. 8 and which encompasses the sub-image SIS, is ended up with.

As indicated above, the sub-image which will be supplied to the user will correspond solely to the sub-image denoted SIS in FIG. 8 and not to the extended sub-image SIE.

However, this sub-image SIS, which was selected by the user, is of much better quality than that which he would have obtained if an extension had not been effected on this sub-image.

When the sub-image is reconstituted, the algorithm of FIG. 5 ends with step S16.

It should be noted that, in elimination mode, the restored sub-image is not necessarily the same size as the requested sub-image.

For all the tiles of the image in question, the same quality and extension mode will preferably be selected in order to avoid irregularities in restoration (quality and size) from one tile to another. This is because such irregularities would be found if the part 220 of the sub-image SIS which overlaps with tile T7 (FIG. 8) were eliminated, whilst the part 210 is kept.

FIG. 9 gives a representation of the different frequency sub-band coefficients in the spatial domain of the original image.

This figure depicts the image delimited by a black border and the position of the tiles with respect to this image.

This figure indicates the position of the different frequency sub-band coefficients for each sub-band for the case of a wavelet decomposition effected according to three decomposition levels.

All these coefficients are represented by rings, inside which there is a different pattern according to which particular sub-band the coefficient belongs to.

This grid of points is periodic and an identical grid pattern is found every 8×8 points.

By definition, the grid of the coefficients is positioned at the origin of the reference frame of this figure, where the first coefficient of the low sub-band, represented by a black ring, corresponds to the point of origin (0,0).

It should be noted that, in the standard JPEG2000, it will be possible both to position the image in this reference frame by specifying the point defined by the coordinates (ulcx, ulcy) and to position the grid of tiles on this image by means of the coordinates point (ultx, ulty).

It should be noted that FIG. 8 represents a particular case where the grid of tiles and the image are both placed at (0,0).

Since these positions change the location of the different elements (tile and position of the coefficients of the sub-bands) it is necessary to take these different parameters into account for calculating the size and for locating the sub-images in the sub-bands.

According to a variant, it may be advantageous to improve the quality of the image selected on the contours thereof.

To do this, the sub-image selected is projected in one or more other frequency sub-bands and one or more other coefficients of this or these other frequency sub-bands are added to the selected sub-image.

The coefficients of a frequency sub-band other than the low sub-band $LL_0$ correspond to a predetermined type different from the type of the coefficients of $LL_0$.

Thus, in projection in this other or these other frequency sub-bands, the size of the sub-image thus projected is increased by seeking one or more coefficients of sub-bands situated in the immediate vicinity of the boundary of the sub-image before it is moved.

It is thus possible to find the extended sub-images in all their frequency sub-bands in order to benefit not only from the coefficients added to the low sub-band of the last level $LL_0$ which afford a significant gain in quality, but also the supplementary details supplied by the sub-bands LH, HL and HH of the different levels.

It should be noted that it may be advantageous to extend the sub-image despite everything even if it already includes two low sub-band coefficients of the last level per dimension in order to perfect the quality of the sub-image on the edges.

For example, consider a sub-image included entirely within the tile T8 (FIG. 8) and already containing more than two coefficients $LL_0$ per dimension. To improve the quality at the edges one or two additional coefficients $LL_0$ are added on the edges.

The invention makes it possible to decode a sub-image whilst optimising the number of coefficients to be decoded.

It is also possible to control the criterion representing the compromise between processing speed and quality of restoration of the sub-image by modifying the length of the relevant extension of each sub-band of the sub-image in question.

The invention is particularly advantageous when an application is considered in which the user sends a request to obtain part of a coded digital signal since he wishes to load, for example, into a computer, only some of the blocks of samples constituting the coded digital signal. These blocks, which have been coded independently, are connected with the part of the signal selected by the user.

In another client-server application, the user or client, remote from the place where the coded image signal is stored, for example, a server, may require to receive from the latter only the part of the image which interests him and therefore sends a request to this end (selected sub-image).

This results in the reception of some of the blocks of samples which were coded independently in the coded digital signal.

The invention claimed is:

1. Method of processing a coded digital signal including a set of samples obtained by coding a set of original samples representing physical quantities using a multiresolution coding format, and including a set of information relating to a size w, h of the set of original samples and its resolution res, comprising the steps of:

locating a subset of original samples of given size zulx, zuly, zh, zw and resolution zres in the set of original samples according to the set of information relating to the size w, h and the resolution res of this set;

determining, amongst coefficients of a low-frequency sub-band $LL_O$ of a last decomposition level obtained by decomposition into frequency sub-bands of the set of original samples, a number of coefficients per dimension of the signal which correspond to the located subset;

deciding, at the decoding side, to modify or not to modify the size of the located subset according to the determined number of low-frequency sub-band coefficients before restoring the located subset, said deciding step including taking into account at least one predetermined criterion representing a quality level for the restored subset of original samples of the digital signal; and modifying the size of the located subset of original samples, in which the modification is an increase in the size of the subset of original samples, wherein by representing, in a space of dimensions corresponding to the dimensions of the digital signal, a position of the coefficients of the low-frequency sub-band of the last decomposition level and a position of the subset of original samples delimited by a boundary, the increase in the size of the subset consists of moving the boundary so as to add to the subset at least one coefficient of the low-frequency sub-band per dimension of the digital signal, the at least one added coefficient being situated close to the boundary before the movement thereof.

2. Method of processing a coded digital signal including a set of samples obtained by coding a set of original samples representing physical quantities using a multiresolution coding format, and including a set of information relating to a size w, h of the set of original samples and its resolution res, comprising the steps of:

locating a subset of original samples of given size zulx, zuly, zh, zw and resolution zres in the set of original samples according to the set of information relating to the size w, h and the resolution res of this set;

determining, amongst coefficients of a low-frequency sub-band $LL_O$ of a last decomposition level obtained by decomposition into frequency sub-bands of the set of original samples, a number of coefficients per dimension of the signal which correspond to the located subset;

deciding, at the decoding side, to modify or not to modify the size of the located subset according to the determined number of low-frequency sub-band coefficients before restoring the located subset, said deciding step including taking into account at least one predetermined criterion representing a quality level for the restored subset of original samples of the digital signal; and modifying the size of the located subset of original samples, in which the modification is a reduction in the size of the subset, wherein by representing, in a space with dimensions corresponding to the dimensions of the digital signal, a position of the coefficients of the frequency sub-bands obtained by decomposition of the set of original samples and a position of the subset of original samples delimited by a boundary, the reduction in the size of the subset consists of moving the boundary so as to remove part of the subset and all the frequency sub-band coefficients situated in the part of the subset.

3. Method of processing a coded digital signal including a set of samples obtained by coding a set of original samples representing physical quantities using a multiresolution coding format, and including a set of information relating to a size w, h of the set of original samples and its resolution res, comprising the steps of locating a subset of original samples of given size zulx, zuly, zh, zw and resolution zres in the set of original samples according to the set of information relating to the size w, h and the resolution res of this set;

determining, amongst coefficients of a low-frequency sub-band $LL_0$ of a last decomposition level obtained by decomposition into frequency sub-bands of the set of original samples, a number of coefficients per dimension of the signal which correspond to the located subset; and deciding, at the decoding side, to modify or not to modify the size of the located subset according to the determined number of low-frequency sub-band coefficients before restoring the located subset, said deciding step including taking into account at least one predetermined criterion representing a quality level for the restored subset of original samples of the digital signal, in which, by representing, in a space of dimensions corresponding to the dimensions of the digital signal, a position of the coefficients of the frequency sub-bands obtained by decomposition of the set of original samples and a position of the subset of original samples delimited by a boundary, said method further comprises a step of adding to this subset at least one coefficient of a frequency sub-band other than the low sub-band per dimension of the digital signal, the at least one added coefficient being situated close to the boundary before the movement thereof.

4. Device for processing a coded digital signal including a set of samples obtained by coding a set of original samples representing physical quantities using a multiresolution coding format, and a set of information concerning a size w, h of the set of original samples and its resolution res, comprising:

means for locating a subset of original samples of given size zulx, zuly, zh, zw and resolution zres in the set of original samples according to the set of information of size w, h and resolution res of this set;

means for determining, amongst coefficients of a low-frequency sub-band $LL_0$ of a last decomposition level obtained by decomposition into frequency sub-bands of the set of original samples, a number of coefficients per dimension of the signal which correspond to the located subset;

means for deciding, at the decoding side, to modify or not to modify the size of the located subset according to the determined number of low-frequency sub-band coefficients, said means for deciding taking into account at least one predetermined criterion representing a quality level for the restored subset of original samples of the digital signal; and means for restoring the located subset, said means for deciding being adapted to make a decision with regard to a modification of the size of the located subset before said means for restoring restore the located subset, wherein, by representing, in a space of dimensions corresponding to the dimensions of the digital signal, a position of the coefficients of the frequency sub-bands obtained by decomposition of the set of original samples and a position of the subset of original samples delimited by a boundary, it is added to this subset at least one coefficient of a frequency sub-band other than the low sub-band per dimension of the digital signal, the at least one added coefficient being situated close to the boundary before the movement thereof.

5. Device for processing a coded digital signal including a set of samples obtained by coding a set of original samples representing physical quantities using a multiresolution coding format, and a set of information concerning a size w, h of the set of original samples and its resolution res, comprising:

means for locating a subset of original samples of given size zulx, zuly, zh, zw and resolution zres in the set of original samples according to the set of information of size w, h and resolution res of this set;

means for determining, amongst coefficients of a low-frequency sub-band $LL_0$ of a last decomposition level obtained by decomposition into frequency sub-bands of the set of original samples, a number of coefficients per dimension of the signal which correspond to the located subset;

means for deciding, at the decoding side, to modify or not to modify the size of the located subset according to the determined number of low-frequency sub-band coefficients, said means for deciding taking into account at least one predetermined criterion representing a quality level for the restored subset of original samples of the digital signal;

means for restoring the located subset, said means for deciding being adapted to make a decision with regard to a modification of the size of the located subset before said means for restoring restore the located subset; and means for modifying the size of the located subset of original samples, wherein said means for modifying comprise means for increasing the size of the subset of original samples, wherein by representing, in a space of dimensions corresponding to the dimensions of the digital signal, a position of the coefficients of the low-frequency sub-band of the last decomposition level and a position of the subset of original samples delimited by a boundary, the increase in the size of the subset consists of moving the boundary so as to add to the subset at least one coefficient of the low-frequency sub-band per dimension of the digital signal, the at least one added coefficient being situated close to the boundary before the movement thereof.

6. Device for processing a coded digital signal including a set of samples obtained by coding a set of original samples representing physical quantities using a multiresolution coding format, and a set of information concerning a size w, h of the set of original samples and its resolution res, comprising:

means for locating a subset of original samples of given size zulx, zuly, zh, zw and resolution zres in the set of original samples according to the set of information of size w, h and resolution res of this set;

means for determining, amongst coefficients of a low-frequency sub-band $LL_0$ of a last decomposition level obtained by decomposition into frequency sub-bands of the set of original samples, a number of coefficients per dimension of the signal which correspond to the located subset;

means for deciding, at the decoding side, to modify or not to modify the size of the located subset according to the determined number of low-frequency sub-band coefficients, said means for deciding taking into account at least one predetermined criterion representing a quality level for the restored subset of original samples of the digital signal;

means for restoring the located subset, said means for deciding being adapted to make a decision with regard to a modification of the size of the located subset before said means for restoring restore the located subset; and means for modifying the size of the located subset of original samples, in which said means for modifying comprise means for reducing the size of the subset, wherein by representing, in a space with dimensions corresponding to the dimensions of the digital signal, a position of the coefficients of the frequency sub-bands obtained by decomposition of the set of original samples and a position of the subset of original samples delimited by a boundary, the reduction in the size of the subset consists of moving the boundary so as to remove part of the subset and all the frequency sub-band coefficients situated in the part of the subset.

7. Method of decoding a coded digital signal which has been processed by a method of processing a coded digital signal according to any of claims 1, 2, and 3, said decoding method comprising the steps of:

extracting the samples from the coded digital signal corresponding to the located subset of original samples having a size which has possibly been modified;

entropic decoding of these samples;

dequantization of the previously decoded samples;

reverse transformation of the decomposition into frequency sub-bands on the previously dequantized samples; and restoration of the located subset of samples.

8. Method according to claim 7, in which said extraction step includes extracting from the digital signal sample blocks corresponding to the located subset of original samples having a size which has possibly been modified.

9. Method according to claim 7, in which the digital signal is an image signal, the samples of the image being arranged to constitute the rows and columns of the image.

10. Means for storing information which can be read by a computer or a microprocessor storing instructions of a computer program implementing the decoding method according to claim 7.

11. Information storage means which is removable, partially or totally, and which can be read by a computer or microprocessor storing instructions of a computer program implementing the decoding method according to claim 7.

12. A computer program stored on an information storage means and read by a computer, containing instructions or portions of code for implementing the steps of the decoding method according to claim 7, when said computer program is executed on a programmable device.

13. Means for storing information which can be read by a computer or a microprocessor storing instructions of a computer program implementing the processing method according to any of claims 1, 2, and 3.

14. Information storage means which is removable, partially or totally, and which can be read by a computer or microprocessor storing instructions of a computer program implementing the processing method according to any of claims 1, 2, and 3.

15. A computer program stored on an information storage means and read by a computer, containing instructions or portions of code for implementing the steps of the processing method according to any of claims 1,2, and 3, when said computer program is executed on a programmable device.

16. Device for decoding a coded digital signal, which has been processed by a device for processing a coded digital signal according to any of claims 4, 5, and 6, said decoding device comprising:
   means for extracting samples from the coded digital signal corresponding to the located subset of original samples having a size which has possibly been modified;
   means for entropic decoding of these samples;
   means of dequantization of the previously decoded samples;
   means of reverse transformation of the decomposition into frequency sub-bands on the previously dequantized samples; and
   means of restoration of the located subset of samples.

17. Device according to claim 16, wherein said means for extracting extract from the digital signal sample blocks corresponding to the located subset of original samples having a size which has possibly been modified.

18. Device according to claim 16, wherein said extracting, entropic decoding, dequantization, reverse transformation, and restoration means are incorporated in:
   a microprocessor,
   a read only memory containing a program for decoding the coded digital signal, and
   a random access memory containing registers adapted to record variables modified during the execution of said program.

19. Device according to any of claims 4, 5, and 6, adapted to process a digital signal which is an image signal, the samples of the image being arranged to constitute the rows and columns of the image.

20. Device according to claim 4, wherein said means for locating, said means for determining, and said means for deciding are incorporated in:
   a microprocessor,
   a read only memory containing a program for processing the coded digital signal, and
   a random access memory containing registers adapted to record variables modified during the execution of said program.

* * * * *

UNITED STATES PATENT AND TRADEMARK OFFICE
CERTIFICATE OF CORRECTION

PATENT NO. : 7,382,923 B2
APPLICATION NO. : 09/981820
DATED : June 3, 2008
INVENTOR(S) : Patrice Onno Page 1 of 1

It is certified that error appears in the above-identified patent and that said Letters Patent is hereby corrected as shown below:

<u>COLUMN 20</u>

Line 18, "of" should read --of:--.

Signed and Sealed this

Twenty-third Day of December, 2008

JON W. DUDAS
*Director of the United States Patent and Trademark Office*